(12) United States Patent
Mäntylä

(10) Patent No.: US 7,376,899 B2
(45) Date of Patent: May 20, 2008

(54) METHOD AND SYSTEM FOR PRODUCING A GRAPHICAL PASSWORD, AND A TERMINAL DEVICE

(75) Inventor: Janne Mäntylä, Espoo (FI)

(73) Assignee: Nokia Corporation, Espoo (FI)

( * ) Notice: Subject to any disclaimer, the term of this patent is extended or adjusted under 35 U.S.C. 154(b) by 594 days.

(21) Appl. No.: 10/871,445

(22) Filed: Jun. 18, 2004

(65) Prior Publication Data

US 2004/0260955 A1 Dec. 23, 2004

(30) Foreign Application Priority Data

Jun. 19, 2003 (FI) .................................. 20030920

(51) Int. Cl.
*G06F 3/00* (2006.01)
(52) U.S. Cl. ...................................... 715/741; 715/742
(58) Field of Classification Search ................ 715/741, 715/742, 810; 707/9
See application file for complete search history.

(56) References Cited

U.S. PATENT DOCUMENTS

| | | | | |
|---|---|---|---|---|
| 5,559,947 | A | 9/1996 | Wugofski .................... | 395/159 |
| 5,559,961 | A | 9/1996 | Blonder .................. | 395/188.01 |
| 5,612,716 | A * | 3/1997 | Chida et al. ................. | 345/630 |
| 5,821,933 | A * | 10/1998 | Keller et al. ................. | 715/741 |
| 2001/0037468 | A1 * | 11/2001 | Gaddis ........................ | 713/202 |
| 2003/0093633 | A1 | 5/2003 | Banning et al. ............. | 713/202 |
| 2004/0010721 | A1 * | 1/2004 | Kirovski et al. ............. | 713/202 |
| 2004/0030934 | A1 | 2/2004 | Mizoguchi et al. .......... | 713/202 |
| 2004/0034801 | A1 * | 2/2004 | Jaeger ......................... | 713/202 |
| 2004/0225880 | A1 * | 11/2004 | Mizrah ........................ | 713/155 |
| 2005/0010785 | A1 * | 1/2005 | Abe et al. .................... | 713/182 |

FOREIGN PATENT DOCUMENTS

| | | |
|---|---|---|
| EP | 0901060 A2 | 3/1999 |
| GB | 2313460 A | 11/1997 |
| WO | WO-01/77792 A2 | 10/2001 |

* cited by examiner

*Primary Examiner*—Kieu D. Vu
*Assistant Examiner*—Dennis Bonshock
(74) *Attorney, Agent, or Firm*—Harrington & Smith, PC

(57) ABSTRACT

In the method a graphical password is produced for an electronic system, such as a database, a computer program or Internet pages, the password being composed of various identifier images that are clearly distinguishable from each other. The system can be located in a terminal device used by the user, such as a mobile phone or an object separate from the terminal device, to which the user can be connected via the terminal device. For producing the password, the electronic system includes an image archive, in which various partial images representing certain subareas of a whole identifier image have been saved in electronic form. The partial images are divided into subgroups so that the partial images of the same subgroup always represent the same subarea of the identifier image. The identifier images belonging to the graphical password are composed by selecting partial images from different subgroups and by combining the selected partial images into one complete identifier image.

14 Claims, 2 Drawing Sheets

METHOD AND SYSTEM FOR PRODUCING A GRAPHICAL PASSWORD, AND A TERMINAL DEVICE

FIELD OF THE INVENTION

The invention relates to a method and a system for producing a graphical password composed of identifier images, in which method the images are selected from among images saved in the image archive of an electronic system and shown on the display of a terminal device connected to the system. The invention also relates to a terminal device with an electronic system according to the invention.

BACKGROUND OF THE INVENTION

Passwords composed of alphanumeric characters are very commonly used for identifying users and for limiting rights of use. Passwords have a long history of use as a means for protecting computers, databases, telecommunication systems and Internet pages against unauthorized users.

However, the use of passwords entails many well-known problems. In order to help remembering the passwords, the users write the passwords on pieces of paper that are easy to find or use easily guessable letter combinations as passwords. In addition, in terminal devices that are only equipped with a numeric keypad, such as mobile phones, it is tempting to use only a combination of numbers as a password, because typing letters is laborious. For this reason, it is often fairly easy to break into systems protected with passwords in practice.

In some known user authentication systems, a password composed of alphanumeric characters has been replaced by a string of images, or a kind of graphical password. In one of such systems, a large number of different facial images of people have been saved in the database. Using facial images is based on the fact that research has shown that people easily remember a face they have seen. When a new graphical password is created for the user, the system or the user randomly selects from the image archive in the database five facial images, for example, and brings them to the display of the terminal device connected to the system to be viewed by the user. After this, the user is allowed to view the images for a suitable period of time, such as 3 to 5 minutes. After the viewing period, the user has been given a graphical password composed of a string of images, which in the future authenticates the user and thus provides access to the system.

When the user wants to sign into the system, the system asks the user to recognize the images belonging to the graphical password from the images produced on the display of the terminal device. The recognition takes place image by image so that the system produces a small number of images, such as nine, on the display, one of which is the "right" image belonging to the password and the rest eight are "wrong" images. The user must point out the right image from the group. After this, the system produces a new group of nine images on the display, among which there is again only one right image, which the user must point out. This is repeated as many times as there are images in the password. When all the images of the graphical password have been found, the system admits the user into the system. A graphical password provides the advantage that it is much easier for the user to remember a group of facial images than an alphanumeric character string. In practice, it is also impossible to write the graphical password on a piece of paper which could end up in the hands of unauthorized persons.

However, the use of a graphical password also entails some problems. To make sure that the graphical password would be clearly different for each user and would provide a sufficiently large number of alternative images when the user is signing into the system, there must be at least several hundreds, preferably thousands of different images saved in the system database. Maintaining such a large image archive naturally consumes a large amount of the system's memory capacity.

SUMMARY OF THE INVENTION

It is an objective of the invention to introduce a new method and system for producing a graphical password in such a manner that the image archive required for producing the password consumes a significantly smaller amount of system memory capacity than in the known methods.

The objectives of the invention are achieved by a method and a system and a terminal device, which are characterized in what is set forth in the independent claims. Some preferred embodiments of the invention are described in the dependent claims.

In the method according to the invention, a graphical password is created for an electronic system, such as a database, a computer program or Internet pages, the password being composed of various identifier images that are clearly distinguishable from each other. For producing the password, the system includes an image archive with image files saved in electronic form. The basic idea of the invention is that there are no complete identifier images in the image archive, but various partial images that represent certain subareas of an entire identifier image. The partial images of the image archive have been divided into subgroups so that the partial images of the same subgroup always represent the same subarea of the identifier image. In practice, the identifier images belonging to the graphical password are composed by selecting partial images from different subgroups and by combining the selected partial images into one complete identifier image. The complete identifier images are shown to the user on the display of the terminal device.

In a preferred embodiment of the invention, the identifier images are facial images of people, and the partial images are images showing different subareas of a human face.

The invention provides the advantage that the total number of images to be saved in the image archive of the system can be substantially reduced, because the number of partial images required is considerably smaller than the number of ready-made, complete identifier images. Thus the image archive clearly consumes a smaller amount of the system's memory capacity.

In addition, the invention provides the advantage that by means of an image archive with a limited memory capacity, it is possible to create a significantly larger number of identifier images that are clearly distinguishable from each other, whereby the number of alternative graphical passwords increases. This makes breaking the password more difficult and thus increases the system's information security.

BRIEF DESCRIPTION OF THE DRAWINGS

In the following, the invention will be described in more detail. Reference will be made to the accompanying drawing, in which.

DETAILED DESCRIPTION

Figure 1:
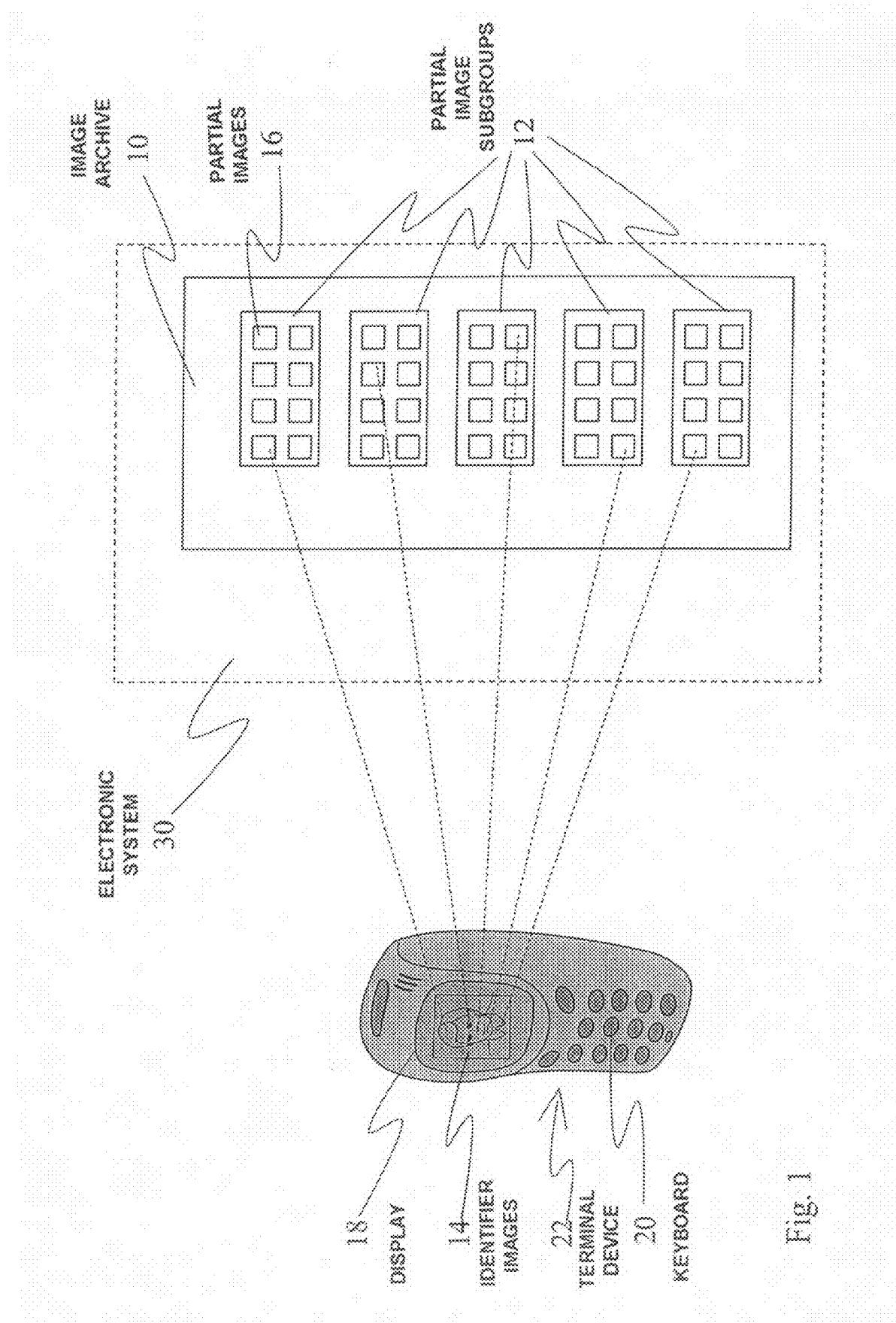
FIG. 1 shows an example of a method and a system according to the invention as a schematic drawing.

In FIG. 1, a method and a system according to the invention is shown by way of example as a simple diagram. In the method according to the invention, a graphical password, known as such, is created by composing it of identifier images 14 shown in succession, which authorizes the user to sign into an electronic system 30, such as a database, computer software or Internet pages. For creating the password, the system includes, in a manner known as such, an image archive 10 with different image files saved in electronic form. The difference between the invention and the prior art lies in that instead of "whole" identifier images, the images saved in the archive are smaller partial images 16, which comprise only a certain part of a whole identifier image. Preferably, the partial images comprise a part of an image representing a human face. The partial images have been divided into subgroups 12 so that the partial images saved in the same subgroup always represent the same part of the identifier image. In FIG. 1, various partial images showing a person's hair have been selected to the first subgroup 12. This subgroup contains partial images showing different, clearly distinguishable hairstyles, such as cropped, short hair, bob or long hair. The hair colour can be different in different partial figures, and the hair can be straight or curly. Taking these distinguishing features into account, it is easy to create a number of clearly distinguishable partial images of hairstyles in the first subgroup 12.

Images of people's eyes have been selected to the second subgroup 12. The partial images of this group are distinguished on the basis of the colour, size and mutual distance of the eyes. Spectacles can also be a distinguishing feature in the images, and there can naturally be several different models of them. Following the same principle, various images of the nose have been selected to the third subgroup 12, images of the mouth and chin to the fourth subgroup, and partial images of the neck to the fifth subgroup.

In the method according to the invention, a whole identifier image 14 is formed by selecting one partial image 16 from each subgroup 12 and by combining the partial images into one whole identifier image, which in this case is an image of a human face. Naturally, the partial images must be bounded in such a way that they can be combined with other partial images selected randomly from any subgroup, and that by combining the partial images a sensible and natural-looking identifier image can be created. Preferably, the partial images representing facial characteristics have been made utilizing the 3D NURBS (Non-Uniform Rational B-Spline) technique well known in the field, by which the partial images can be defined as three-dimensional surface formations by means of data sets. By adding the characteristics of skin on top of these surface formations, it is possible to create a large number of different partial images of faces, which consume only a small amount of memory capacity.

In the method and system according to the invention, all different subgroups of the image archive can contain the same number of partial images, or the subgroups can contain different numbers of partial images. For example, of certain subareas of a facial image it is easy to get several clearly distinguishable partial images, whereas in some other subgroups of facial characteristics it is more difficult to create distinguishable partial images. For example, the subgroup describing a person's hair could contain 12 partial images and the subgroup describing the eyes could contain 6. The subgroups describing a person's nose, mouth and neck could each contain 3 different partial images, for example. Thus the total number of partial images in the image archive would be 27. However, by combining the partial images in different ways, they can be used to form hundreds of whole facial images that differ from each other for at least one feature of the face.

In the case shown by FIG. 1, there are 5 subgroups in the image archive, but naturally there can also be more subgroups. It is only essential that each subgroup contains partial images that are sufficiently clearly distinguishable from each other, and that by combining the partial images a distinguishable and easily remembered identifier image can be created. When the identifier image is produced, one partial image is preferably always selected from each subgroup. However, in the invention it is also possible to arrange alternative subgroups in the image archive, in which case the partial images selected to the identifier image do not necessarily come from each subgroup.

Using facial images as identifier images of a graphical password is advantageous because most people are very good at remembering a face they have seen. The method and system according to the invention are not limited to using facial images only, but in addition to or instead of facial images, other identifier images can also be used for producing a graphical password. In one preferred embodiment of the invention, the image archive includes a subgroup 12, in which various partial images describing human body have been saved. These partial images are distinguished on the basis of the type of body and clothing. Furthermore, the range of subjects for the identifier images is not limited only to images representing human body or parts thereof. The image archive can thus preferably contain subgroups in which images such as different flags of countries or various clearly distinguishable buildings, structures or natural landscape have been saved.

A graphical password need not consist of images only, but some common words which have a known semantic content can also be used as a part of the password. The words used can be the names of people, towns or countries, or occupational titles, for example. The words have been saved in the image archive preferably as text files and grouped into subgroups in the same way as the partial images, preferably so that the words in each subgroup denote matters with the same class of meanings. The words are processed in the graphical password as partial images 16, which represent a certain word. The image archive can thus have, for example, one subgroup for men's first names, another subgroup for women's first names and a third subgroup for occupational titles. Thus a single word of a subgroup constitutes the partial image of one whole identifier image. One identifier image of a graphical password can thus be formed of a man's facial image, combined with the man's first name and occupation and an image of the Eiffel tower in the background. In a corresponding manner, the second identifier image of the graphical password can be formed of a woman's facial image, for example, combined with the woman's first name and occupation and a flag of a country in the background. Because the words that belong to the graphical password always have a well-known meaning, it is easy for the user to memorize them and to remember them when the password is asked. Memorizing is also facilitated by the fact that the words are presented to the user during the creation of the password together with some image, preferably the image of a human face. For example, the image of a woman's face, the woman's first name and occupation as seen together form one association that is easily memorized and recalled. It is also easy to construct short sentences or stories of words with a well-known meaning to facilitate remembering them.

In the invention, the password that authorizes signing into the electronic system 30 is seen by the user as a series of identifier images. Obviously the system itself does not process the password as a string composed of images, but as a character string understood by the programming language used in the system. Each partial image of the identifier image is therefore provided with an individual character or character string, whereby each graphical password that is visible to the user as identifier images constitutes a character string which can be read by the system.

The method and system according to the invention are used in the following manner: When the user is given the right to sign into an electronic system 30, a new graphical password is created for him/her. The system selects partial images 16 from the subgroups 12 of the image archive 10 in the system and combines the partial images into one identifier image 14. The identifier image can also be created so that the partial images or at least some of the partial images of which the whole identifier image is formed are selected from the subgroups of the image archive by the user. This is repeated as many times as there are images in the graphical password. In other words, for creating a password of five identifier images, the operation is repeated five times, whereby five clearly distinguishable identifier images are obtained. After this, the system brings these identifier images to the display 18 of the terminal device 22 connected to the system to be viewed by the user. The terminal device can be a terminal device connected to the system via a fixed network, such as a computer or a wireless terminal, such as a mobile phone. The user is allowed to view the images on the display for a suitable length of time, for example 3 to 5 minutes, during which the user memorizes the images. The length of the viewing time can be predetermined, or it can be selected by the user. After the period of viewing, the user has obtained a graphical password composed of identifier images, which authorizes signing into the system. The electronic system and the terminal device need not necessarily be located separately, but the system can also be located in the terminal device, such as a mobile phone. In that case, the terminal device itself is protected by a graphical password and its unauthorized use is prevented.

When the user wants to sign into the system, the system asks the user to point out the images belonging to the graphical password from the images produced on the display 18 of the terminal device 22. Recognition takes place image by image so that the system produces a small number of images, such as nine, on the display 18 of the terminal device, one of which is the "right" identifier image belonging to the graphical password and the rest eight are "wrong" images. The "wrong" identifier images have been created from the partial images saved in the image archive by the same principle as the "right" identifier images. The user must point out the right image from the group of images produced on the display. For pointing out the identifier image, the terminal device 22 must have a keyboard 20 or some other means for pointing out the image. For pointing out the identifier images, the images of the image group are preferably numbered so that they can be easily pointed out on the keyboard by pressing the right numeric key. In the system according to the invention, it is also possible to use a terminal device 22 with a touch-screen display. Pointing out can then be carried out by touching the identifier image shown on the display. When the identifier image has been pointed out, the system produces a new group of nine images on the display, among which there is again only one right identifier image, which the user must point out. This is repeated as many times as there are images in the password. When all the images of the graphical password have been found, the system admits the user into the system.

If the user selects the wrong image of the images produced on the display, the number of image groups produced on the display can be increased. For example, selecting one wrong image can produce two new groups of images, from which the right image must be selected. In this way, finding the right password by guessing can be prevented.

Electronic systems often use a screen saver, which appears on the display of the terminal device when the connection to the system has been unused for a sufficiently long time. It is known that the removal of the screen saver from the display can also be arranged so that the password is required. In a method according to the invention, this can be advantageously implemented in the same way as in connection with signing in, e.g. by asking the user to recognize the right identifier image from a group of images produced on the display. A smaller number of identifier images is preferably enough to remove the screen saver; for example, finding only one right identifier image from the group of images produced on the display could be enough. By means of the invention, it is thus easy to arrange graphical passwords with different levels of security in the same system, the passwords being based on the identifier images created when the graphical password was created, but differing from each other with regard to the number of identifier images.

Figure 2:
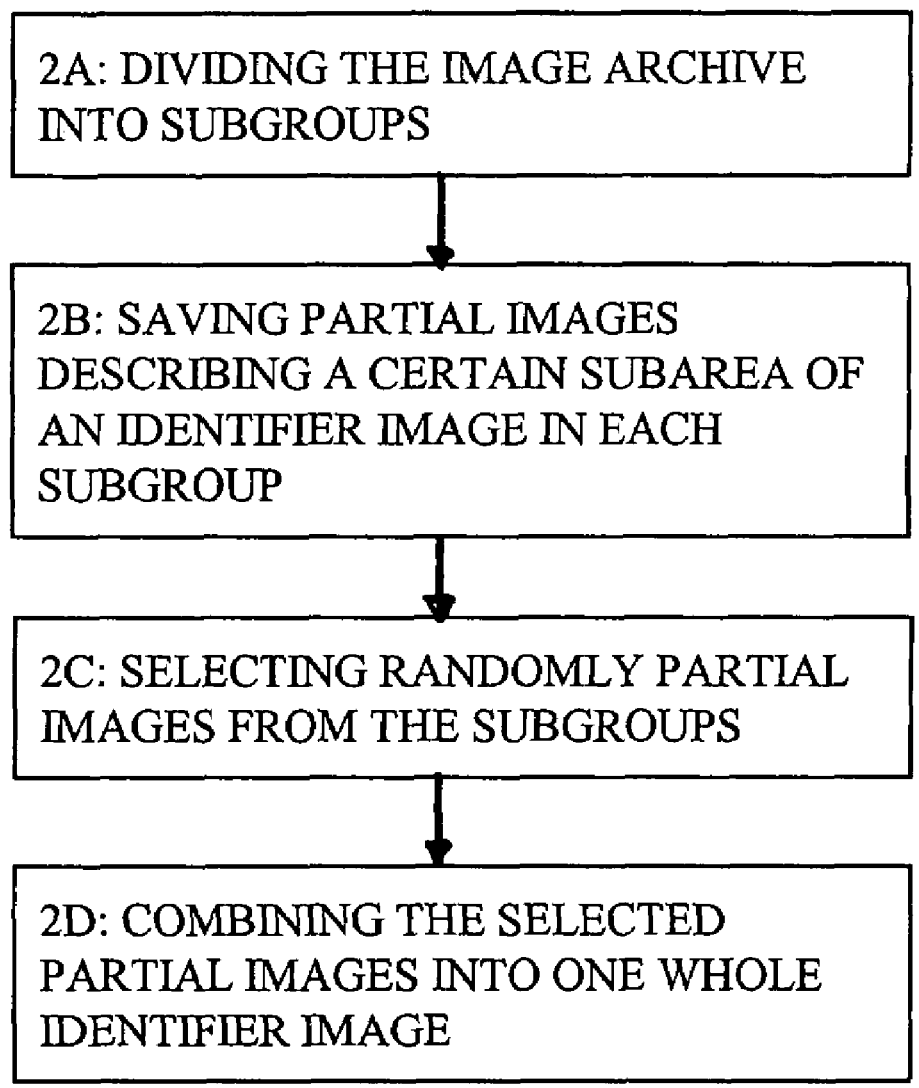
FIG. 2 shows a logic flow diagram in accordance with a method of the invention.

A method in accordance with the invention produces a graphical password composed of identifier images, in which method the identifier images are selected from images saved in the image archive 10 of the electronic system 30 and shown on the display 18 of a terminal device 22 connected to the system 30. Referring to FIG. 2, the identifier images are created by:

(Block 2A) dividing the image archive 10 into subgroups 12, (Block 2B) saving partial images 16 describing a certain subarea of the identifier image in each subgroup 12, (Block 2C) selecting randomly partial images 16 from the subgroups 12, and (Block 2D) combining the selected partial images 16 into one whole identifier image 14.

Some preferred embodiments of the method and system according to the invention have been described above. The invention is not limited to the above described solutions only, but the inventive idea can be applied in many ways within the scope defined by the claims.

The invention claimed is:

1. A method comprising:

dividing an image archive of an electronic system into subgroups, wherein the image archive comprises images, saving partial images describing a certain subarea of an identifier image in each subgroup, wherein the identifier image is selected from the images in the image archive and shown on a display of a terminal device connected to the system, selecting randomly partial images from the subgroups, where selecting randomly is performed by the electronic system, and combining the selected partial images into one whole identifier image;

repeating the dividing, saving, selecting, and combining to form any additional whole identifier images, the one whole identifier image and the any additional whole identifier images each forming a graphical password for a user of the terminal device; and sending the whole identifier images from the electronic system to the terminal device, wherein the partial images comprise an image that represents at least one subarea of at least one of the human face and the human body.

2. A method according to claim 1 wherein one partial image is selected from each subgroup.

3. A method according to claim 1 wherein the partial images are selected only from some of the subgroups.

4. A method according to claim 1 wherein forming the graphical password comprises creating a desired number of identifier images, which form the graphical password, and showing all the identifier images together on the display of the terminal device.

5. A method according to claim 1, further comprising requesting a password by arranging on the display a group of images, which include one identifier image belonging to the graphical password and a number of other images formed by combining from the partial images, and asking the user to point out the identifier image belonging to the graphical password from the group of images.

6. An electronic system comprising: an image archive for saving the images and a terminal device connected to the system, the terminal device having a display for presenting identifier images and means for pointing out the identifier images, wherein the image archive is divided into subgroups, and partial images describing a certain subarea of one of the identifier images are saved in the subgroups so that individual partial images selected randomly from the subgroups by the system are combined into one corresponding whole identifier image forming at least part of a graphical password that is sent to the terminal device, wherein the partial images comprise an image that represents at least one subarea of at least one of the human face and the human body, wherein dividing, saving, selecting, and combining is repeated to form any additional whole identifier images, the one whole identifier image and the any additional whole identifier images each form a grahical password for a user of the terminal device.

7. A system according to claim 6, wherein the terminal device is a mobile phone.

8. A terminal device comprising: a display for presenting identifier images and means for pointing out the identifier images, wherein the terminal device with an electronic system is adapted to produce a graphical password composed of identifier images, the system comprising an image archive for saving the images, wherein the image archive is divided into subgroups, and partial images describing a certain subarea of the identifier image have been saved in the subgroups so that individual partial images selected randomly by the electronic system from the subgroups by the electronic system are combined into one whole identifier image that is sent from the electronic system to the terminal device, wherein the partial images comprise an image that represents at least one subarea of at least one of the human face and the human body, wherein dividing, saving, selecting, and combining is repeated to form any additional whole identifier images, the one whole identifier image and the any additional whole identifier images each forming a graphical password for a user of the terminal device.

9. A terminal device according to claim 8, which is a portable terminal device.

10. An electronic system comprising: an image archive divided into subgroups, with each subgroup storing a plurality of partial images each descriptive a certain subarea of an identifier image, the electronic system being configured to communicate with a terminal device; the system further configured to select randomly for later transmission a partial image from individual ones of at least some of the subgroups to construct at least one whole identifier image and to provide the at least one constructed identifier image to the terminal device, and to respond to a correct selection of the at least constructed one identifier image by a user of the terminal device to authorize admission of the user into the electronic system, wherein the partial images comprise an image that represents at least one subarea of at least one of the human face and the human body, wherein dividing, storing, selecting, and constructing is repeated to form any additional whole identifier images, the one whole identifier image and the any additional whole identifier images each forming a graphical password for a user of the terminal device.

11. The system according to claim 10, wherein the terminal device is a portable terminal device.

12. The system according to claim 10, where the electronic system is separate from the terminal device and is connectable therewith through a network.

13. The system according to claim 10, where the electronic system is separate from the terminal device and is connectable therewith through a wireless network.

14. The system according to claim 10, where the electronic system comprises a portion of the terminal device.

* * * * *